Jan. 8, 1957 R. C. FAULWETTER 2,776,914
COATED STONE AGGREGATE
Filed July 8, 1954

INVENTOR
ROY C. FAULWETTER

BY
ATTORNEYS

United States Patent Office 2,776,914
Patented Jan. 8, 1957

2,776,914

COATED STONE AGGREGATE

Roy C. Faulwetter, Detroit, Mich.

Application July 8, 1954, Serial No. 442,200

3 Claims. (Cl. 117—100)

This invention relates broadly to concrete and like floors, and other structural surfaces of the type disclosed in my prior Patent No. 2,491,487 issued December 20, 1949, wherein resinous materials were incorporated with the concrete or like mixtures.

My present invention appertains more particularly to a novel method of producing a water impervious and chemically resistant concrete by introducing certain desirable resinous and chemical mixtures into the concrete mass by means of coating the stone particles or aggregate with the desired resins and chemicals and later redissolving the resins and chemicals by applying appropriate solvents to the surface of the concrete.

One of the primary objects of my invention is the provision of the composition of certain desirable mixtures of resinous materials and other chemicals, which when redissolved within the set concrete mass by means of appropriate solvents applied to the surface of the concrete floor or molded object, will permeate and diffuse throughout the concrete, rendering the same impervious to water, resistant to chemical corrosion and free from infestation by bacteria, yeast fungi and vermin.

Another salient object of my invention is the provision of pre-prepared stone aggregates for sale and for use with a concrete or like mixture having a coating of desired resinous materials and other chemicals, whereby such treated aggregates can be incorporated in the desired proportion in the concrete mixture, with means after the laying of the mixture for releasing such substances to accomplish a desired result.

In the drawing, forming a part of this application,

Figure 1:
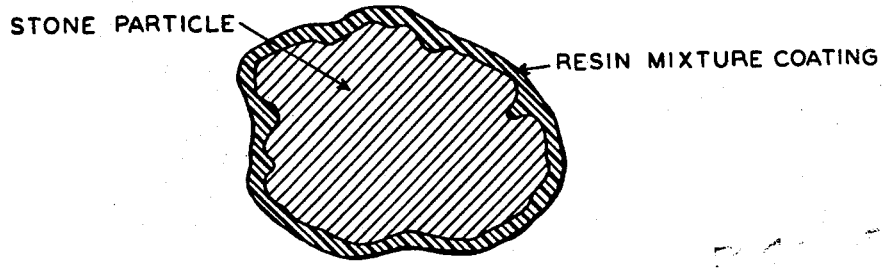
Figure 1 is an enlarged detail sectional view through a stone particle or piece of aggregate treated in accordance with the invention.
Figure 2:
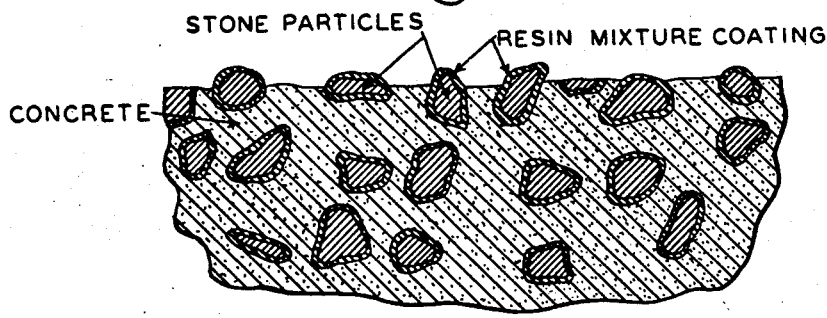
Figure 2 is a fragmentary vertical sectional view showing the treated stone particles or aggregate mixed in a laid section of concrete.
Figure 3:
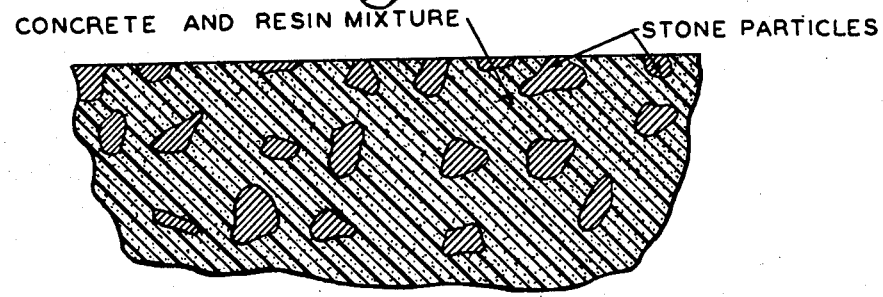
Figure 3 is a view similar to Figure 2 and showing the section of concrete after the treating and polishing thereof to free the plastic coating from the particles or aggregate and to disperse the same thruogh the concrete.

My prior Patent No. 2,491,487 is based upon the admixture of such resinous materials as vinyl acetate-chloride copolymers which are supplied in commerce in the form of very finely divided particles or amorphous powder and this material can be incorporated with facility in the concrete mixture. However, there are equally desirable resins which are not available as powder and do not lend themselves to the simple admixing with the concrete ingredients at the time of preparing the same for making concrete. Examples of such ingredients are: coumarone-indine, which is sold in flakes, lumps or in solution; chlorinated rubber and ethyl cellulose in irregular granules.

It is both difficult and costly to convert such substances into suitable powders for direct admixing with the ingredients of cement concrete. Also the spaces which such flakes, lumps or granules would occupy in the concrete mass make undesirable voids when the resin is dissolved within the mass by action of solvent.

It is, therefore, another object of my invention to use such materials in my process and whereby such materials can be utilized to coat the stone aggregate for direct sale to the trade.

There are also available resins for combining certain of these resins with other resins or modifiers, and with plasticizers. These combinations or mixtures are most conveniently made by placing all desired ingredients into solution in a mutual solvent; for instance, when chlorinated rubber and coumarone-indine are combined, aromatic hydrocarbon solvents are used; when ethyl cellulose and chlorinated poly-phenyl are employed an alcohol-toluene mixture can be used.

The advantages of such mixtures are: (a) reduced cost of the resultant mixture when less expensive resin (coumarone-indine) is added to a more costly, but more highly desirable resin (chlorinated rubber); or, (b) to reduce the time required for the re-solution of the resin within the concrete mass (when chlorinated diphenyl plasticizer is added to chlorinated rubber), or, (c) to permit the use of inexpensive solvents having hi-flash points and high solvency power (modified hi-flash naphtha). Preferred exact samples of such resin mixtures by weight are as follows:

*Example No. 1*

30 parts chlorinated rubber
65 parts chlorinated poly-phenyl
5 parts chlorinated biphenyl
200 parts hi-flash naphtha (flash point 150 degrees F.)

In this example, the chlorinated rubber functions as a film former, the chlorinated poly-phenyl acts as a fortifier and the chlorinated biphenyl functions as a plasticizer. All of the solid ingredients remain in the resultant mixture after the evaporation of the solvents, namely, hi-flash naphtha.

*Example No. 2*

25 parts ethyl hydroxethyl cellulose
65 parts glycol ester of hydrogenated rosin
10 parts chlorinated diphenyl
180 parts hi-flash naphtha solvent (flash point 150 degrees F.)
20 parts isopropanol—99%

In this mixture, the ethyl hydroxethyl cellulose functions as a film former; the glycol ester of hydrogenated rosin acts as a diluent, the chlorinated diphenyl acts as a plasticizer and the naphtha functions as solvent. In this example, the hi-flash naphtha used is modified with aromatic hydrocarbons to increase its solvency (butyl-kaurin rating) power.

*Example No. 3.—Resin mixture*

This example pertains, not to a "mixture" of resins and other chemical substances, but to the use of certain resins that are furnished in the trade, in a liquid form only, such as vinyl-acetate-chloride copolymer resins available in solution with butyl-acetate 100 cc. of Vinylite VYCC (40.5% solution), 100 cc. of butyl acetate.

The viscosity of this compound is sufficiently lowered to permit ready wetting of stone aggregates for the purpose intended.

The most practical method of incorporating the above mixtures (Examples 1 and 2) of solid resin ingredients and other chemicals mentioned is as follows:

(1) To thoroughly wet the stone aggregate particles with the desired solutions of resins; second, evaporating off the solvent by one of the following methods, namely, (a) by exposing the wet particles to the air and sunlight with frequent stirrings; (b) by setting in an oven or under heating lamps and (c) by placing in any container and passing a stream of dry air through the aggregate.

After the drying of the stone particles, the same are ready for use and sale and these stone particles which have the resinous film on their surfaces are mixed in with the hydraulic cement and water to manufacture concrete in the usual way. The cement used may be gray Portland, white or aluminous.

To accomplish several desirable objectives in this process such as utilizing the highest possible concentration of resin mixture in solution thereby having least possible solvent to lose by evaporation, also (b) reducing the most highly concentrated and viscous solution to the minimum viscosity, it may be desirable to pre-heat the stone to approximately the boiling point of the resin solution and also to heat the solution to the same point. Upon wetting the heated stone with such heated solution, a large quantity of stone can be thoroughly coated with a minimum volume of solution, the solvent vapors simultaneously driven off more rapidly and the resin solids precipitated upon the surface of the stone particles, thereby reducing both the time required for this operation and the cost of the original solvent eliminated from the process. By minimizing the proportion of plasticizers in the resin mixture formula, masses of stone which may lump together during the drying period are readily separated by tumbling or stirring after cooling. Up to five percent (resin solids to stone) of resin solids has been applied to stone particles without any serious lumping.

By adding oil-soluble dyes to the plastic solution while the latter was being prepared, the film deposited upon the surface of the stone will appear in the color of the dye used. If the concrete were made with white cement, the stones would appear very prominently on the cross-section of a broken fragment. After appropriate solvent has been applied to the surface of the concrete and allowed to permeate the mass so that the plastic film on the stone surfaces has been re-dissolved, the duffusion of the resultant solution will be easily observed as the coloration spreads throughout the concrete mass. Thus the desired resinous ingredients which consist of materials not available in usable form as articles of commerce, will have been uniformly distributed throughout the set concrete mass. In such formulations, one or more resinous ingredients shall be of the class known as "film-former" which usually swell upon being dissolved and which retain permanent continuity in form of a relatively flexible and tenacious layer or coating upon the surface of the object to which it is applied.

For convenience in regulating the amount of resinous material within the set concrete mass, it has been found that a measure of the resin solids deposited upon the surface of the stone particles based upon the percent of weight of the stone, can be used satisfactorily. For example, when resin solids equivalent to one percent of the weight of the stone is desired, such amount can be determined as follows: 500 lbs. of stone will require 5 lbs. of resin solids; in a 33% solution of resin (as will be found in the formulas described above) that amount of solids will be obtained in 15 lbs. of the solution. If all of this amount is used to wet 500 lbs. of stone, it is obvious that the residual film will be composed of 5 lbs. of resin.

When dry and used in the preparation of concrete, and the concrete has become set and sufficiently dry, approximately two gallons of appropriate solvent will be required to penetrate the concrete and redissolve the resinous coating on the stone particles and diffuse the resinous materials to a depth of ⅜ inch. The surface should be kept continuously wet with solvent for at least three hours.

Deeper penetration may be obtained by prolonging the wetting period, through the above depth of ⅜" is considered adequate to render floor concrete water impervious and chemically resistant.

Solvent used should be of as slow evaporating type as will serve the purpose of dissolving the particular resins and chemicals used in making the film; should be of as high flash point for safety reasons as will serve the same function. High boiling solvents generally have low solvent power but have the very desirable character of slow evaporation, which prolongs the time the solvent is in contact with the resin mixture coating the stone particles. Choice of solvent is perforce dictated by the nature of the resin to be dissolved. In the case of chlorinated rubber, it has been found that a mixture of equal parts of modified aromatic naphtha and di-octyl adipate makes (a) an efficient solvent, (b) a very slowly evaporating solvent, and (c) with an extremely high flash point. The last quality makes it safe to treat large floor areas with minimum fire hazard.

In addition to the value of this method of integrating concrete with resinous materials for water proofing and rendering the same chemically resistant, it has been demonstrated that such integrated concrete is stronger in tensile and crushing strength and undergoes greatly reduced dimensional change under varying humidity conditions. Panels made of such concrete resist warping, floors resist shrinking and cracking caused by moisture conditions. (Has no bearing on thermal changes.) Sewer and field drain tiles made of concrete show less tendency to efflorescence with resultant disintegration of the concrete. Concrete poles used for electric lights and electric power lines will resist winter freezing and spawling because of reduced moisture content of concrete in freezing weather. Fence posts and vineyard posts will likewise withstand winter freezing.

From the foregoing description, it can be seen that I have set out preferred methods and processes of treating a stone aggregate to be used in a concrete or like mixture for structural purposes.

Changes in details may be made without departing from the spirit or the scope of this invention, but what I claim as new is:

1. The process that includes the coating of stone particles with water insoluble but otherwise soluble resinous material and incorporating the coated stone particles in a concrete mixture which comprises hydraulic cement and water, said coating consisting of a mixture of chlorinated rubber, chlorinated poly-phenyl, chlorinated biphenyl and a hi-flash naphtha.

2. The process that includes the addition of stone particles coated with a a water insoluble but otherwise soluble resinous material in a concrete mixture which includes hydraulic cement and water, said particles being coated with a mixture of 30 parts chlorinated rubber, 60 parts chlorinated poly-phenyl, 5 parts chlorinated biphenyl and 200 parts hi-flash naphtha, and allowing the evaporation of the naphtha after the coating of the particles and prior to the incorporation of the coated particles with the cement and water.

3. Stone aggregate particles to be used in a concrete mixture coated with a resin mixture, said resin mixture including a chlorinated rubber, chlorinatde polyphenyl, and chlorinated biphenyl.

References Cited in the file of this patent

UNITED STATES PATENTS

| Number | Name | Date |
|---|---|---|
| 1,884,471 | Wittenberg | Oct. 25, 1932 |
| 1,972,390 | Miner | Sept. 4, 1934 |
| 2,059,983 | Dent | Nov. 3, 1936 |
| 2,092,903 | Benner | Sept. 14, 1937 |
| 2,491,487 | Faulwetter | Dec. 20, 1949 |
| 2,559,664 | Ries | July 10, 1951 |